(12) United States Patent
Järredal

(10) Patent No.: US 8,966,608 B2
(45) Date of Patent: Feb. 24, 2015

(54) PREVENTING SPOOFING

(75) Inventor: Ulf Järredal, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1141 days.

(21) Appl. No.: 12/520,275

(22) PCT Filed: Dec. 22, 2006

(86) PCT No.: PCT/EP2006/012441
§ 371 (c)(1),
(2), (4) Date: Jun. 1, 2010

(87) PCT Pub. No.: WO2008/077414
PCT Pub. Date: Jul. 3, 2008

(65) Prior Publication Data
US 2011/0010769 A1    Jan. 13, 2011

(51) Int. Cl.
*G06F 7/04* (2006.01)
*H04L 29/06* (2006.01)
*G06F 15/16* (2006.01)
*G06F 9/00* (2006.01)

(52) U.S. Cl.
CPC ........ *H04L 63/0236* (2013.01); *H04L 63/1466* (2013.01)
USPC .................. 726/13; 726/22; 726/23; 726/24; 726/25; 726/26; 370/392; 370/469; 709/228

(58) Field of Classification Search
CPC ......................... H04L 63/0236; H04L 63/0227
See application file for complete search history.

(56) References Cited

U.S. PATENT DOCUMENTS

| | | | | |
|---|---|---|---|---|
| 5,581,559 | A  * | 12/1996 | Crayford et al. | 370/392 |
| 5,615,340 | A  * | 3/1997 | Dai et al. | 709/250 |
| 7,356,034 | B2 * | 4/2008 | Kobayashi | 370/392 |
| 7,370,356 | B1 * | 5/2008 | Guo | 726/22 |
| 7,379,423 | B1 * | 5/2008 | Caves et al. | 370/232 |
| 7,797,738 | B1 * | 9/2010 | Spatscheck et al. | 726/13 |
| 7,913,294 | B1 * | 3/2011 | Maufer et al. | 726/3 |
| 7,996,537 | B2 * | 8/2011 | Nesz et al. | 709/227 |
| 2002/0133586 | A1 * | 9/2002 | Shanklin et al. | 709/224 |
| 2002/0161918 | A1 * | 10/2002 | Asano et al. | 709/238 |
| 2003/0152067 | A1 * | 8/2003 | Richmond et al. | 370/352 |
| 2005/0122966 | A1 * | 6/2005 | Bowes | 370/360 |

(Continued)

FOREIGN PATENT DOCUMENTS

| | | |
|---|---|---|
| JP | 2003223307 A | 8/2003 |
| WO | 2006099303 A | 9/2006 |

OTHER PUBLICATIONS

Updates to the Catalyst 3550 Multiplayer Switch Software Configuration Guide, 12.2 (25); Cisco Systems, Inc.; San Jose, California, US; Jan. 2005.

*Primary Examiner* — Dede Zecher
*Assistant Examiner* — Trang Doan

(57) ABSTRACT

A method and access node for preventing spoofing while connecting subscribers to an Ethernet network. The access node includes a filter mechanism for filtering packets destined to subscribers attached to the access node. The filter mechanism includes a database of allocated IP destination addresses and MAC addresses. The filter mechanism blocks any packet directed to a subscriber but containing an incorrect IP or MAC address. The mechanism prevents users from changing their address information to illegally appropriate packets from other users or to disguise their identity.

4 Claims, 3 Drawing Sheets

(56) References Cited

U.S. PATENT DOCUMENTS

2005/0125692 A1* 6/2005 Cox et al. .................... 713/201
2005/0243818 A1* 11/2005 Foglar et al. ................. 370/389
2006/0209818 A1 9/2006 Purser

* cited by examiner

PREVENTING SPOOFING

FIELD OF INVENTION

The present invention relates to security over a public network, such as the Internet, for users connected to a shared media access network, such as the Ethernet.

BACKGROUND ART

When using the Internet, it is desirable for a user to be identified by a specific Internet Protocol (IP) address. This helps with the identification of illegal traffic or activities that are a danger to national security, for example. However, if a user is connected to the Internet via a public Ethernet network, the identification of users becomes more difficult, as in a standard network there are no technical barriers against a user changing both his IP-address and MAC-address, an activity commonly referred to as "spoofing". The term "Public Ethernet" designates an Ethernet network in which the core network is composed of self-learning switches or nodes forming an aggregated network. Switching through the aggregated network is accomplished using the destination media access control (MAC) address of packets, with each node gradually associating MAC addresses with the associated destination addresses as they receive and redirect packets. This may be accomplished using address resolution protocol (ARP) requests to an edge node or router in the network each time a switch in the aggregate network receives a packet with a new MAC address.

It is possible to impose a user identification within an Ethernet access network, wherein each subscriber is required to use a unique username and password to login before being awarded access to the network, such as imposed by the point-to-point protocol PPPoE. However, such systems are not always appreciated as the need to login each time inevitably slows the access. A further technical solution in such a shared media consists of routing all traffic between all users. However, this is expensive and inefficient. The access nodes must be capable of routing all traffic and each user is effectively assigned at least one IP-subnet, which generally includes four IP-addresses, regardless of the number of IP-addresses required. When such restrictions on the configuration of or routing within the Ethernet access network are not present, security within the network is reliant on mutual trust and on all users following administration rules.

In the light of this prior art, it is thus an object of the present invention to increase the security over an Ethernet access network without imposing restrictions on the configuration or routing within the network itself.

SUMMARY OF THE INVENTION

This and further objects is achieved in an access node for connecting at least one subscriber to an Ethernet network. The access node has a table for storing address information of the connected subscribers. It also includes a filter module adapted to identify the destination address of data packets received over said network and to permit transmission of the data packets to one of said subscribers only when the packet has a destination address corresponding to the address information stored in said table.

Such an arrangement effectively prevents a user from receiving information destined for another user following the transmission by this user of false address information that could cause the aggregate network to divert traffic erroneously away from the genuine destination. However, the network is completely unaffected and traffic may continue to flow via the shortest route through the aggregate network.

Preferably, the access node stores both the IP and MAC addresses assigned to the subscribers. This permits the blocking of traffic routed erroneously on the basis of the MAC address alone within the aggregate network.

A further level of security is achieved when the filter module is arranged to identify additionally the source address information contained in packets received from one of the subscribers for transmission over the network, and also to permit transmission of these packets onto the network only if the packet source address information corresponds to the address information stored in the table.

Any attempt by a user to illicitly utilise a false or duplicate IP address through error or for some malicious purpose is thus prevented.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
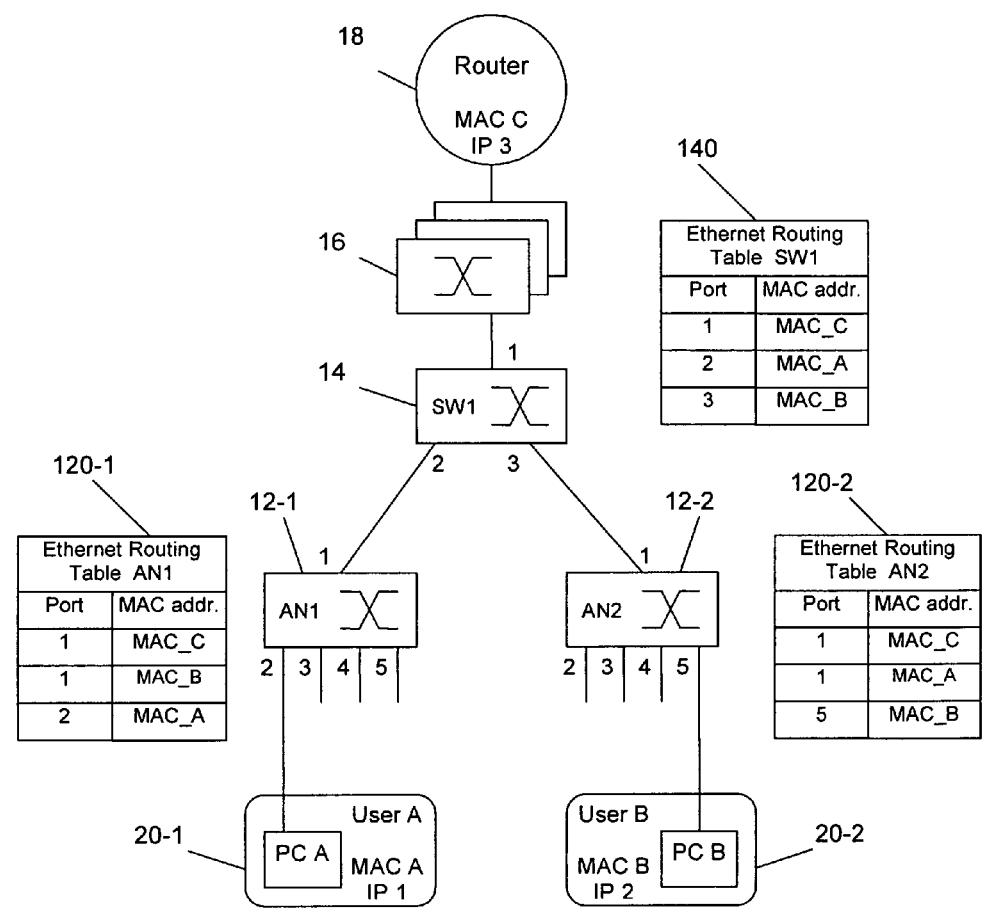
FIG. 1 schematically illustrates a standard Ethernet network with standard Ethernet switches and with access nodes in accordance with the present invention, FIG. 2 schematically illustrates the functional elements of an access node in accordance with the present invention.

FIG. 1 illustrates a standard Ethernet network 10 serving, in the present example, as an access network to the Internet or to another external network connected to the Internet. The connection to the external network is assured by a router 18, which is connected to the aggregate network made up of standard self-learning Ethernet switches 14, 16. The structure and function of the switches 14, 16 of the aggregate network are well known in the art and will not be described further here. Two subscribers, User A 20-1 and User B 20-2 are shown connected to the network 10 via access nodes 12-1, 12-2. The illustrated subscribers are PCs, however, it will be understood that other devices may constitute subscriber devices. Conventional access nodes 12-1, 12-2 include the Fibre Ethernet Access ELN200 manufactured by Ericsson or the ADSL Ethernet modem EDA ESN312 IPDSLAM by Ericsson. The access nodes 12-1, 12-2, of the present embodiment may be based on these known devices but include additional functions and features as described hereinafter.

For illustrative purposes, each access node AN1 12-1, AN2 12-2 is shown with five ports. In the present embodiment, User A 20-1 is shown connected to port 2 of access node AN1 12-1, while User B 20-2 is shown connected to port 5 of access node AN2 12-2. The remaining ports of the access nodes AN1 12-1, AN2 12-2 are unoccupied, but it will be understood by those skilled in the art that additional subscribers may be connected to these ports. In the illustrated arrangement, port 1 of each of the access nodes AN1 12-1, AN2 12-2, is connected to a port of an Ethernet switch 14 forming part of the aggregate network. More specifically, access node AN1 12-1 is connected to port 2 of this switch 14, while access node AN2 12-2 is connected to port 3 of the switch. A third port, port 3 of the Ethernet switch 14 is connected to another switch in the aggregate network 16.

Each of the subscribers User A, 20-1, User B 20-2 connected to the network 10 is assigned an IP-address and a MAC address. The IP address is normally defined and communicated by the Internet service provider ISP. The MAC address is generally configured in the subscriber network interface card (NIC card) with a unique MAC address being predefined in the factory. For illustrative purposes User A 20-1 has a MAC address MAC A and IP address IP 1, while User B 20-2 has a MAC address MAC B and IP address IP2. The router 18 is also assigned a MAC and IP address, in the present example MAC C and IP 3, respectively. Within the aggregate network routing is based only on the MAC addresses contained in a data packet destination address. Each switch 14, 16, and access node 12-1, 12-2 holds routing information. This is illustrated in FIG. 1 by the Ethernet routing table 140 associated with Ethernet switch 14, table 120-1 associated with access node 12-1 and table 120-2 associated with access node 12-2, each of which is used by the associated switch or node for forwarding packets to the correct port on the basis of the destination MAC address. This routing information contained in these tables, 140, 120-1, 120-2, is gradually accumulated as the switches or nodes "learn" to associate packets with specific MAC addresses with a particular route, based on source address information received in ARP requests, DHCP replies or other packet transmissions. Once this information is present, packets are transmitted through the aggregate network via the shortest path.

However, in such an arrangement a subscriber may attempt to change his MAC address or IP address even when these are already assigned to another user in order to steal packets from other users. For example a user may transmit packets with a false source MAC or IP address, which will subsequently be assimilated into the routing tables. For example, in FIG. 1 User B 20-2 could change his MAC address from MAC B to MAC A in order to sporadically steal Ethernet packets destined for User A 20-1. While the number of packets that could be highjacked in this way is small, possibly only one in 10,000, this fraudulent use my still be attractive to a malicious subscriber, as over time it is likely that a stolen packet will contain sensitive information, such as a secure password, or the like. This may be achieved as follows: User A sends a TCP/IP request via PC A to the Internet and awaits an answer. User B sends a dummy packet via PC B intended to redirect traffic using the source address as MAC A rather than MAC B. This dummy packet causes the Ethernet switch SW1 14 to change its routing table so that a packet with the destination address MAC A is mapped to port 3 rather than port 2. Similarly, the routing table at access node AN2 12-2 is changed so that a packet with destination address MAC A is mapped to port 5. Following these changes, the reply to the TCP/IP request sent by User A—or any other packet destined for PC A 20-1—will be redirected to PC B 20-2 and User B. Similarly, User B may assume the MAC address of the router 18 by sending a dummy packet from PC B 20-2 with a source address of MAC C. This step would cause the Ethernet switch SW1 14 to alter its routing table to map a packet addressed to MAC C to port 3 instead of port 1 and the access node AN2 to change its routing table to map MAC C to port 5. Any packet sent with a destination address MAC C intended for the router 18 within the network 10, for example from PC A 20-1, would then be redirected to PC B 20-2.

Figure 2:
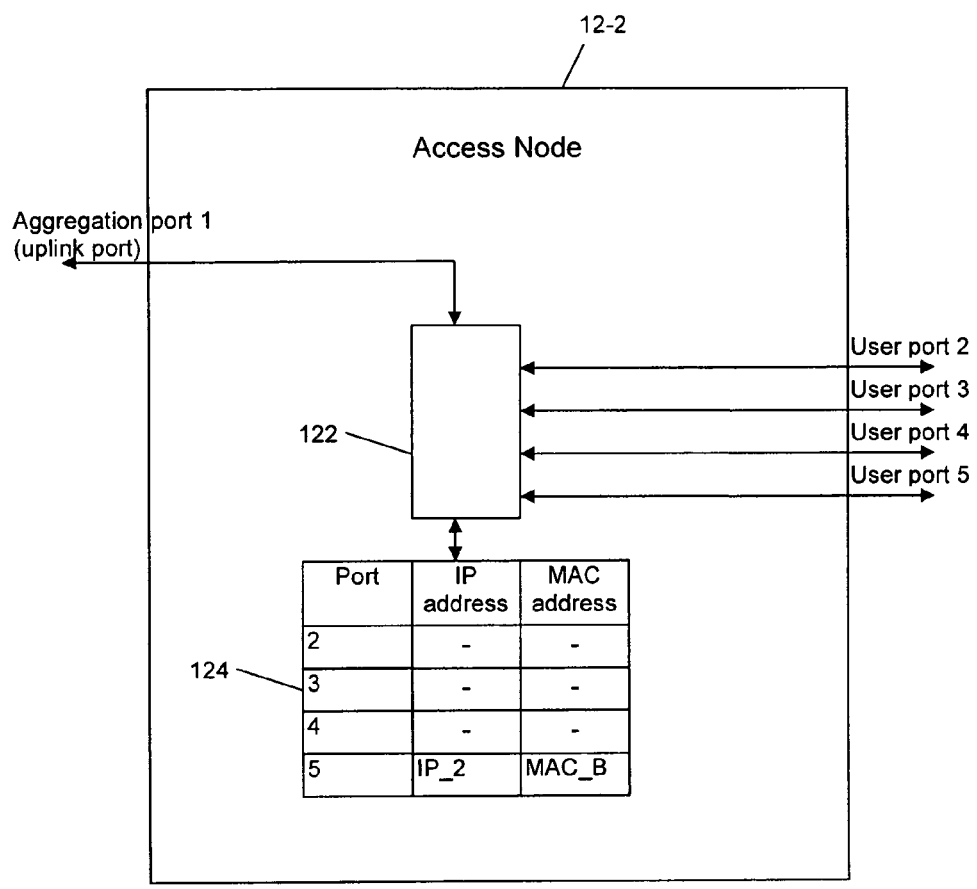

In accordance with the present invention, this is prevented by providing a filtering function in the access nodes. FIG. 2 shows a simplified and schematic representation of a filtering arrangement within the access node 12-2. As illustrated in FIG. 2, each access node 12 has a filter module 122, which extracts address information from each incoming packet and verifies that the IP address corresponds to that of a subscriber connected to the access node 12 by consulting a table 124. Table 124 contains the correct—that is, the initially assigned—IP and MAC addresses for each connected subscriber. The filter module 122 checks the MAC destination address of all incoming packets against that assigned to the IP address subscriber by referring to the table 124. If these match, the packet is transmitted on to the subscriber; if no match is found, the packet is blocked. In this manner, if a subscriber utilises a different MAC address to the originally assigned address as source address in outgoing packets, as described in the two examples above, these packets will be blocked by the access node.

The filter function within the access node 12 occurs without the subscriber's knowledge. Fraudulently misdirected packets will simply be blocked at the access node rather than being passed onto the subscriber, as would occur if the Ethernet routing table were used.

In addition to filtering incoming or downlink packets on the basis of the destination IP and MAC addresses, the filter module 22 may also filter outgoing packets to ensure that these contain a valid IP source address. This function serves to prevent subscribers from illegally using the IP address of another user. For example, User B could change the IP source address of packets sent from PC B 20-2 in a TCP/IP request to the Internet from IP B to IP A. The response, although addressed to IP A, that is, the IP address of PC A 20-2, would be routed through the network 10 using the MAC source address that featured in the TPC/IP request, i.e. MAC B, and hence be directed to User B at PC B 20-2. By blocking those packets having a source IP address that does not belong to one of the connected users, or alternatively that does not form a legal pair with the MAC address associated with one of the connected subscribers, the access node prevents the fraudulent or accidental appropriation of packets.

The filtering of uplink or outgoing packets according to the IP address by an access node is a known feature of some access nodes and is generally incorporated into Public Ethernet networks, to enable all users to be identified by their IP address. However, when this known filtering mechanism is combined with the filtering function of the present invention, namely the filtering of incoming packets according to the destination IP and MAC address pair, the security of the network is greatly improved. Moreover, this improved security is achieved without affecting the basic structure of the access network or restricting a bona fide subscriber. For example, a subscriber has no need to submit to a login procedure as would be necessary when the point-to-point protocol (PPPoE) is implemented. A network operator has no significant changes to make.

Figure 3:
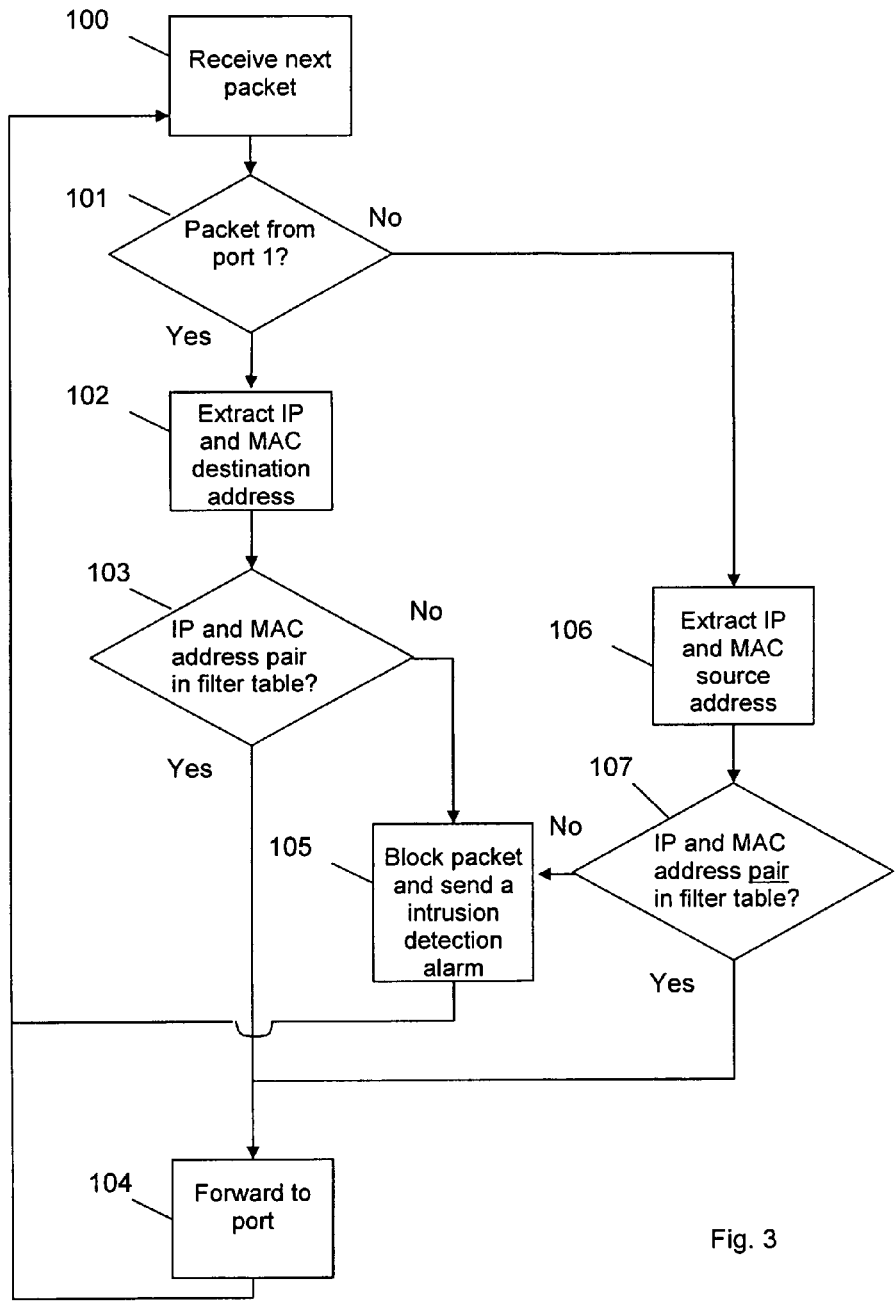
FIG. 3 shows a flow diagram illustrating the filtering function of an access node in accordance with the present invention.

The function of the filtering mechanism within an access node 12 is illustrated in a flow diagram in FIG. 3. Starting at event 100, the filter module 122 receives the next incoming packet. At step 101 it is determined at which port the packet was received. If it was received at port 1, and thus represents a packet received from network 10, the method continues to step 102. At this third step, the IP and MAC destination address pair is extracted from the packet header. At step 103, these addresses are compared with the entries in filter table 124. If the two addresses are paired in an entry in this table, they represent a legitimate subscriber address. The method then continues to step 104 and the packet is sent to the corresponding port. If, on the other hand, the extracted IP and MAC destination address pair are not contained in an entry in table 124, the method passes to step 105 and the packet is blocked. In the case of the access node AN2 12-2, the filter table 124 contains only the MAC and IP address of the subscriber User B (PC B, 20-2). The entry thus contains a port number 5, the IP address IP 2 and the MAC address MAC B. Any other combination of IP and MAC address would result in a "No" at step 103 and the method would pass to step 105, with the blocking of the packet. If, at step 101 the packet is received from one of ports 1 to 5, indicating that it has been sent from outside the network 10 by a subscriber, the method passes to step 106, where the IP and MAC source addresses are extracted. Filter table 124 is then consulted at step 107, and if the IP source address, or the combination of IP and MAC source address contained in the packet, does not figure in the table, the method passes to step 105 and the packet is blocked. This would indicate that a subscriber has illegally modified at least the allocated IP source address in the packet If, on the other hand, the IP source address, or IP and MAC source address combination, is found in the table at step 107, the method proceeds to step 104 with the forwarding of the packet to the correct port as defined in a conventional ARP table (Ethernet routing table) in a known manner. In addition to blocking an unauthorised packet, the filter function 122 may also signal the event to the network operator by sending an alarm. In addition the access node 12 could create a log of the incident for transmission to, or consultation by the access network operator or administrator. The increased highjacking of a neighbours traffic by using a false MAC address, while potentially representing a security risk, will also impact on the amount of traffic present on the access network, as misdirected packets will inevitably be resent. Consequently the quality of service that can be provided by the network will be degraded. If a network operator is alerted to the problem, steps can be taken to block the fraudulent subscriber, for example by disconnection of his port.

The filter table 124 may be generated as and when subscribers connect to the access node 12. The IP address allocated to each subscriber could be acquired by snooping messages exchanged between the internet service provider (ISP) and the subscriber, such as dynamic host configuration protocol (DHCP) or point-to-point protocol (PPP) messages. Alternatively, if the IP address is configured manually, this may be obtained by interrogating the subscriber or the ISP directly. The MAC address also may be obtained by interrogation.

The filter table 124 illustrated in FIG. 2 is shown as a separate entity from the Ethernet routing tables 120-1 and 120-2. However, it will be understood that the filter table 124 could ultimately be substituted for the routing tables 120-1, 120-2, with the ports defining which addresses are used for the filter function. For example, filter table 124 shown in FIG. 2 would be expanded to include information on at least the MAC addresses to be routed via port 1, while the filter function would operate only on addresses stored in association with ports 2 to 5.

The invention claimed is:

1. An access node for connecting a subscriber to an Ethernet network, the access node comprising:
    a database for storing an Internet Protocol (IP) address in association with a Media Access Control (MAC) address for the subscriber; and
    a filter mechanism connected to the database for filtering data packets received over the network and addressed to the subscriber, and for filtering data packets received from the subscriber for transmission over the network, wherein the filter mechanism is configured to:
    for each data packet received over the network:
        extract an IP destination address and a MAC destination address from each data packet received over the network;
        determine whether the extracted IP destination address and the MAC destination address matches the subscriber IP address and MAC address stored in the database; and
        permit transmission to the subscriber of each data packet received over the network only when the extracted IP destination address and the MAC destination address matches the subscriber's IP address and MAC address stored in the database; and
    for each data packet received from the subscriber:
        extract an IP source address and a MAC source address from each data packet received from the subscriber;
        determine whether the extracted IP source address and the MAC source address matches the subscriber IP address and MAC address stored in the database; and
        permit transmission over the network of each data packet received from the subscriber only when the extracted IP source address and MAC source address matches the subscribers IP address and MAC address stored in the database.

2. The access node as claimed in claim 1, wherein the filter mechanism is also configured to generate an alarm signal when the IP destination address and the MAC destination address extracted from one of the data packets received over the network does not match the stored IP address and MAC address for the subscriber.

3. A method of filtering packets at an access node that connects a subscriber to an Ethernet access network, said method comprising the steps of:
    storing in a database, an Internet Protocol (IP) address in association with a Media Access Control (MAC) address for the subscriber;
    utilizing a filter mechanism to filter data packets received over the network and addressed to the subscriber, wherein for each data packet received over the network, the filter mechanism performs the steps of:
        extracting an IP destination address and a MAC destination address from each data packet received over the network;
        determining whether the extracted IP destination address and the MAC destination address matches the subscriber IP address and MAC address stored in the database; and
        permitting transmission to the subscriber of each data packet received over the network only when the extracted IP destination address and the MAC destination address matches the subscriber's IP address and MAC address stored in the database; and
    utilizing the filter mechanism to filter data packets received from the subscriber for transmission over the network, wherein for each data packet received from the subscriber, the filter mechanism performs the steps of:
        extracting an IP source address and a MAC source address from each data packet received from the subscriber;
        determining whether the extracted IP source address and the MAC source address matches the subscriber IP address and MAC address stored in the database; and
        permitting transmission over the network of each data packet received from the subscriber only when the extracted IP source address and MAC source address matches the subscribers IP address and MAC address stored in the database.

4. The method as claimed in claim 3, further comprising the step of generating an alarm signal when the IP destination address and the MAC destination address extracted from one of the data packets received over the network does not match the stored IP address and MAC address for the subscriber.

* * * * *